March 2 1943. E. A. SWEELEY ET AL 2,312,939
MOVABLE BULKHEAD FOR VEHICLES
Filed Feb. 17, 1942 4 Sheets-Sheet 1

Inventor
Edward A. Sweeley
and Norman T. Anderson
Attorney

March 2 1943.    E. A. SWEELEY ET AL    2,312,939
MOVABLE BULKHEAD FOR VEHICLES
Filed Feb. 17, 1942    4 Sheets-Sheet 4

Inventor
Edward A. Sweeley
and Norman T. Anderson
By
Attorney

Patented Mar. 2, 1943

2,312,939

UNITED STATES PATENT OFFICE 2,312,939

MOVABLE BULKHEAD FOR VEHICLES

Edward A. Sweeley, Alexandria, Va., and Norman T. Anderson, Washington, D. C.

Application February 17, 1942, Serial No. 431,306

15 Claims. (Cl. 62—19)

This invention relates to improvements in facilities for railway or other vehicles. While the invention has particular application to facilities for railway cars, it is also applicable to cars, trucks, and ships generally, which require or use such facilities for similar purposes.

In its broadest aspect, the invention relates to facilities for use in the interior of a vehicle having a merchandise chamber, the facilities being adapted for arrangement to provide an ice receiving bunker adjacent the merchandise chamber when refrigeration of the merchandise in the chamber is desired. According to a preferred embodiment of this invention, the facilities providing the ice bunker are adapted for rearrangement into compact form whereby the size of the merchandise chamber is substantially increased. The ice bunker facilities may be arranged in compact form when the vehicle shipment does not require the refrigeration service of an ice bunker, or when increased merchandise storage space is desired, or when the vehicle is to be ventilated, instead of refrigerated by ice, during its travel. A vehicle so equipped has important advantages. It provides efficient ice refrigeration when such is required. It also permits full car loading when the ice bunker is not in use and thereby reduces the shipper's freight per package handled.

The ice bunker facilities of this invention include an adjustable bulkhead which may serve as partitioning means between the vehicle merchandise chamber and the vehicle ice bunker space and which may be adjusted so that the ice bunker space becomes a continuation of the merchandise chamber and thereby increases the size of the lading space of the vehicle. When the bulkhead is not used as a partitioning means, it may be placed adjacent an inner wall of the vehicle and serve as a wall of the enlarged merchandise chamber.

It is an object of this invention to provide improved and novel facilities for vehicles whereby the facilities may be readily arranged to provide the vehicle with an ice bunker for holding ice to refrigerate the vehicle merchandise chamber and may be readily rearranged in compact form to increase the lading capacity of the vehicle.

A further object is to provide a novel and sturdy form of reinforcement for the bulkhead of a vehicle.

Still another object is to provide an adjustable bulkhead for a vehicle and novel means for reinforcing the bulkhead when used as a partition in the vehicle and when adjusted to permit full loading of the vehicle with the bulkhead serving as a wall of the enlarged vehicle merchandise chamber.

A still further object is to provide a vehicle with novel means which are adapted to form the side walls of an ice bunker and to provide support for ice grates and which may be adjusted to an out-of-the-way protected position when not in use.

Still another object is to provide a novel and improved ice supporting structure for an ice bunker of a vehicle, the bunker being of the type to be rearranged in compact form when the ice bunker space is required for the loading of merchandise.

Another object is to provide an adjustable bulkhead for the purpose of adjusting the length of the loading compartment of a vehicle to suit the space required for compact loading of merchandise and to eliminate bracing to take up slack in the load, which bracing is generally supplied by and installed by the shipper at his expense.

A still further object is to provide novel bunker side walls, which are adapted for use as side walls of an ice bunker when used for full ice refrigeration, part-stage icing, or reduced icing, and which, when not in use, may be folded into a position where they are protected from damage by movement or shifting of cargo.

A further object is to provide a vehicle with a bulkhead which is adjustable to a retracted position adjacent a vehicle end wall and also to an extended position spaced from the vehicle end wall for serving as a partition, and means for reinforcing the bulkhead from the vehicle end wall in either of its adjusted positions.

A further object is to provide a novel and efficient form of water and cinder deflector for the hatchway of a vehicle which is adapted for full loading and adapted for conversion to a refrigeration vehicle with its interior divided into ice chamber space and lading space.

Another object is to provide a vehicle with a novel hatch closure or water and cinder shield or deflector and novel means for operating the closure when a bulkhead in the vehicle is adjusted to change the loading capacity of the vehicle.

A further object is to improve, in general, the ice bunker and bulkhead facilities of vehicles adapted for the shipment of merchandise. According to this invention, such facilities are of relatively simple construction which will serve its intended purpose for extended periods of use without need for repair and which permit ready conversion of the vehicle for use as an ice bunker refrigerator vehicle or as a full load carrier.

Other advantages and objects of this invention will be apparent from the following description, the appended claims, and the accompanying drawings which illustrate a preferred embodiment of this invention.

Referring now to the accompanying drawings,

Figure 1 is a view taken on line 1—1 of Figure 3.

In the accompanying drawings, an ice bunker structure is provided at one end of a railway car. It will be understood that this illustrated bunker structure may, if desired, be duplicated at the other end of the car.

The illustrated car may have conventional features, such as the usual main floor 1, car end wall 2, car side walls 3, 4, car roof 5, hatchways 6, and a lading space or merchandise chamber 7. The car walls 2, 3 and 4 may be of any suitable construction. These walls should be of stout construction and may have an outer shell of metal for added strength and reinforcement. The lading (not shown) in the chamber 7 may be supported on the usual false floor or floor racks 8 which rest on the main car floor 1. The end of the car has a drip pan 9 positioned at a lower level than the top of the car main floor 1 of the lading space 7. A series of posts 11 are secured to the car inner end wall and support a screen 12 in spaced relation to the car inner end wall to provide air circulating passages 13 (see Figure 2).

In a preferred embodiment of this invention, the car is provided with an adjustable bulkhead 15 which extends transversely of the car from car side wall 3 to car side wall 4 and also from a level adjacent the level of the floor racks 8 to adjacent the car ceiling. This bulkhead 15 has a series of vertically extending posts, each preferably including an I beam 16 as a reinforcement. The bulkhead 15 (see Figures 3, 5) also includes a screen 17 and vertically extending air circulating passages 18. Air may also circulate through the top of the bulkhead 15 by way of screen 17, opening 19 and screen 20. The top frame member of the bulkhead 15 is formed by a reinforced channel shaped beam 21.

Figure 3:
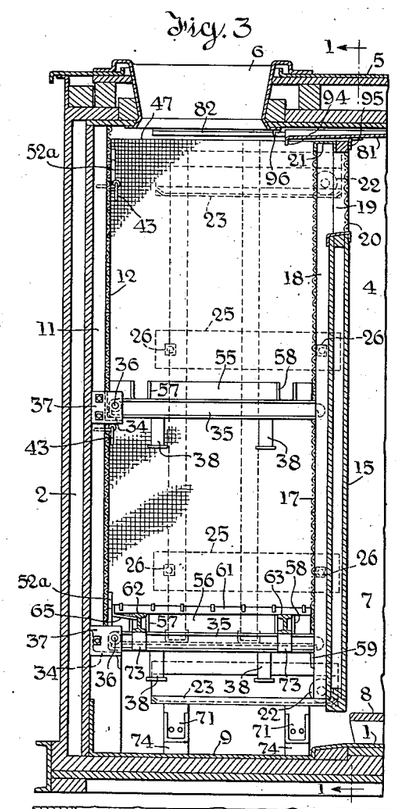
Figures 3 and 4 are views taken on line 3—3 of Figure 1, Figure 3 illustrating the ice bunker arranged to receive ice, and Figure 4 illustrating one stage in the process of rearranging the ice bunker to provide for full car loading.
Figures 5, 7, 8, 9:
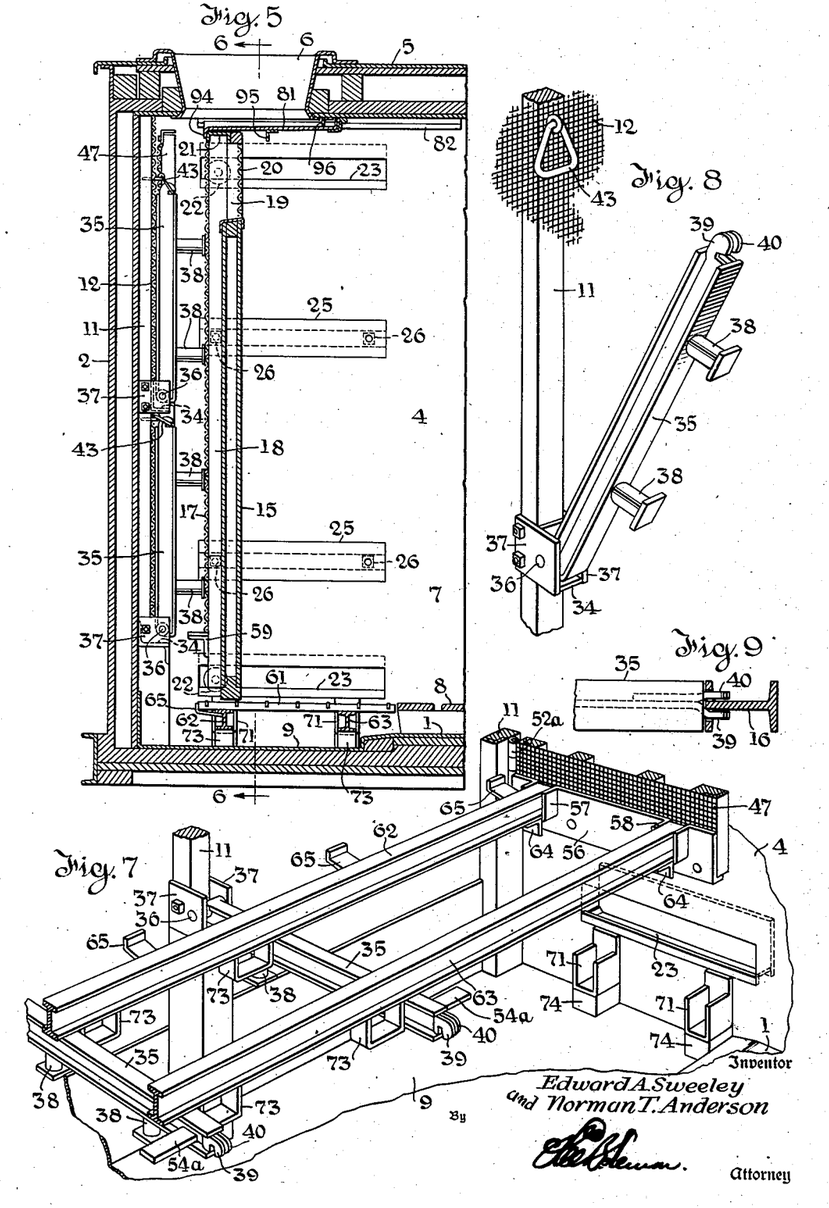
Figure 5 is a view taken on the same line as Figures 3 and 4, Figure 5 illustrating the ice bunker folded or collapsed to provide for full car loading.
Figure 7 is a detail view in perspective of the ice grate supporting structure of Figure 3, the ice grate sections and the bulkhead being omitted in Figure 7 for purposes of illustration.
Figure 8 is a detail view in perspective of one of the pivotally supported strut members shown in Figures 2 to 7 inclusive.
Figure 9 is a detail view of the strut and bulkhead connection shown in Figure 3.

The bulkhead is supported by rollers for sliding adjustment to either the position of Figure 3 or the position of Figure 5 and is locked or secured in its adjusted positions. According to the illustrated form of this invention, the bulkhead is provided with two upper and two lower rollers 22 (Figure 1) which rest and roll in tracks or guides 23. These tracks or guides 23 are set in recesses in the car inner side walls and preferably do not extend into the lading space 7 where projections might interfere with car loading. Each track 23 may be provided with a side flange to retain the corresponding roller 22 in proper position in the track and with upturned end flanges (Figure 7) to limit the travel of its roller 22.

Figure 1:
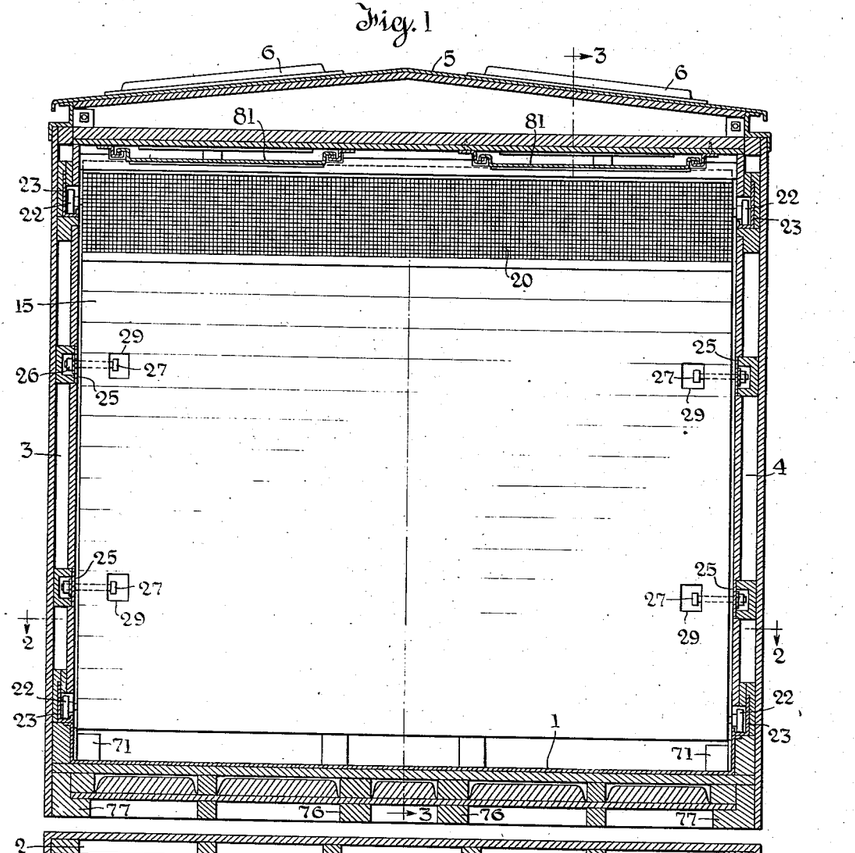
Figure 1 is a transverse sectional view of a railway car provided with an embodiment of this invention and shows an adjustable bulkhead in position to serve as a partition between an ice bunker space and the car lading space.

The bulkhead 15 is locked in adjusted position by locking means such as those shown in the drawings. The locking means may comprise 4 sets of nut and bolt connections (Figure 1). As these sets are all of the same construction, only one set need be described. A reinforced plate 25 is set in a car inner side wall and carries two or more threaded elements or nuts 26 (Figure 3). A threaded bolt 27 is carried by the bulkhead 15 and is adapted to be projected through a selected and suitable opening in the plate 25 for threaded engagement with a nut 26. The plate 25, its openings, and the nuts 26 are so arranged that the corresponding bolt 27 may have engagement with a nut 26 when the bulkhead is in either the position of Figure 3 or the position of Figure 5. Thus in either adjusted position, the bulkhead 15 is supported from the car side walls by means of four rollers 22 and four bolts 27. Each bolt 27 may be operated through a corresponding hand hole 29 in the bulkhead as shown in Figure 1.

Figure 13:
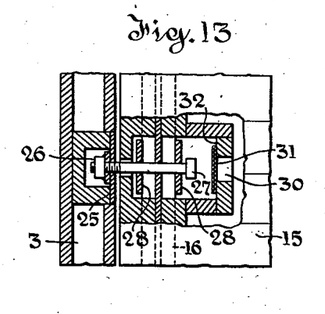
Figure 13 is a detail view of a bulkhead securing device shown in Figure 1.
Figure 14:
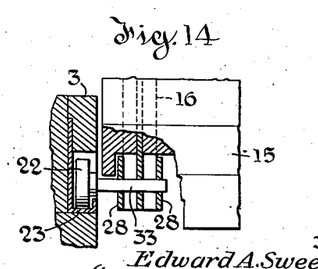
Figure 14 is a detail view of a bulkhead roller support shown in Figure 1.

Each of the bolts 27 may be slidably and rotatably supported in an I-beam 16 of the bulkhead 15 and two plates 28 welded to the I-beam 16 as shown in Figure 13. The illustrated support for the bolts 27 may also be used in supporting the pins or shafts 33 of the rollers 22 as shown in Figure 14.

The head of a bolt 27 may be received in a housing 32, (Figure 13) having an opening 30 through which the bolt 27 may be removed. Opening 30 may be covered by a closure of canvas 31 to prevent accidental movement of the bolt into the opening 30. Closure 31 may be secured in place at its top edge and lifted when bolt 27 is to be removed from its housing 32.

In either of its adjusted positions, the bulkhead 15 is braced by means of strut members 35. These strut members 35 are provided in desired number and arranged in desired manner. As a preferred example, the drawings show four of the strut members 35, two being arranged at a lower level than the other two. All four strut members 35 are illustrated as adjacent the car center midway of the car side walls 3 and 4. As the strut members 35 are of similar construction and are similarly supported, a description of only one strut member 35 and its support need be provided. A strut member 35 may be formed of a section of an I-beam to provide strength (see Figure 8). At one end, the strut member 35 is pivotally supported from the car end wall 2. This end of the strut member 35 carries a pin 36 which is journaled in a bracket or pocket comprised of two plates 37 which are bolted or otherwise secured to opposite sides of an end wall post 11 and which are connected adjacent their lower edges by a bridging piece 34. The strut member 35 may be placed in either the horizontal position of Figure 3 or swung on its pivotal support (36, 37) to the upright position of Figure 5. Each strut member 35 is also provided with projections or abutments 38 which may be pipe sections welded at one end to a flange of the strut member 35 and having a flanged head at the other end for a purpose to be described.

The outer end of the strut member 35 is preferably hook-shaped (Figures 8 and 9). An integral extension of the web of the strut I-beam may be shaped to form a hook 39. A separate plate may be welded at its inner end to the web of the strut I-beam and have its outer end formed to provide a second hook 40 similar to the hook 39. The hooks 39 and 40 are preferably spaced apart a distance corresponding to the thickness of the web of the I-beam 16 (Figure 9).

When the bulkhead 15 is adjusted to its position of Figure 3, it serves as a partition between the lading space 7 and the ice receiving compartment at the end of the car. In its use as a partition, the bulkhead 15 is not only supported by the four rollers 22 and the four bolts 27 (Figure 1), but is also reinforced by the strut members 35 (Figure 3). To provide this reinforcement, each of the strut members 35 is swung to its horizontal position, in which its hooks 39 and 40 extend through suitably shaped slots in an I-beam 16 of the bulkhead 15 and engage flanges of the I-beam at opposite sides of the I-beam web (see Figure 9). The strut members 35 now provide reinforcement between the car end wall 2 and the bulkhead 15, whereby the car end wall 2 serves to brace the bulkhead 15. The bulkhead 15 is, therefore, particularly well adapted to resist the thrust of the lading or the ice load in the ice compartment as it shifts during car movements or car switching operations.

When the bulkhead 15 is positioned as in Figure 5 to provide for full car loading, the strut members 35 are arranged in upright position as in Figure 5. Each strut member 35 is retained in upright position by a loop member 43 which is secured to the corresponding car end wall post 11 and which engages the strut hooks 39 and 40 (see Figures 5, 6 and 8). The bulkhead 15 now is in position to bear against the flanged heads of abutments 38 in event the bulkhead 15 receives the thrust of the lading in the merchandise compartment or chamber during car movements or car switching operations. In the adjusted relation of Figure 5, the bulkhead is reinforced at eight points by the eight abutments 38 which are uniformly and symmetrically distributed over the central area of the bulkhead 15. When the bulkhead 15 is subjected to impact by movement of the lading, a large part of this thrust is transmitted through the abutments 38, the struts 35 and the corresponding car end wall posts 11 and to the car end wall 2. In this way, the structure of the car end wall 2 as well as the struts 35 and the abutments 38 serve to reinforce the bulkhead 15 when in the position of Figure 5.

Figure 2:
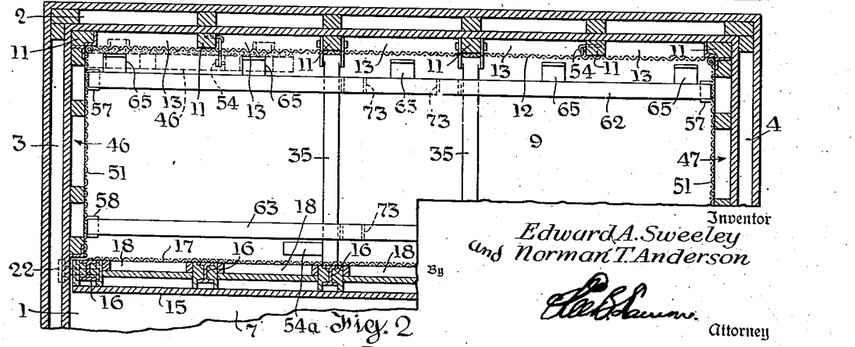
Figure 2 is a top plan view taken on line 2—2 of Figure 1 and shows the interior of an ice bunker embodying this invention. For purposes of illustration, Figure 2 omits the ice grate sections of Figure 3.
Figure 6:
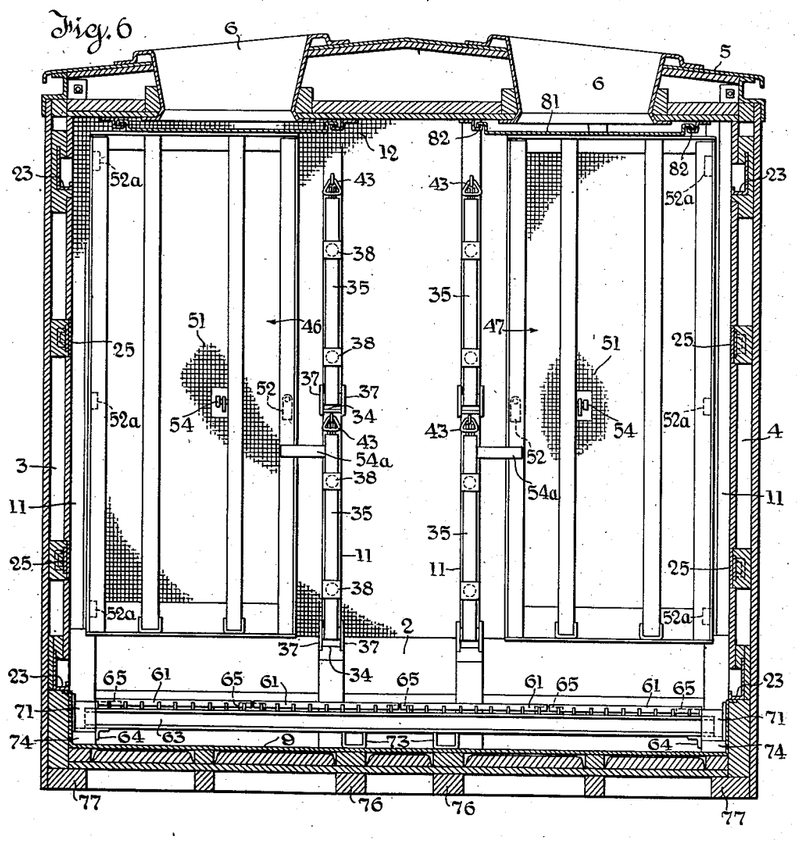
Figure 6 is a view taken on line 6—6 of Figure 5.
Figure 10:
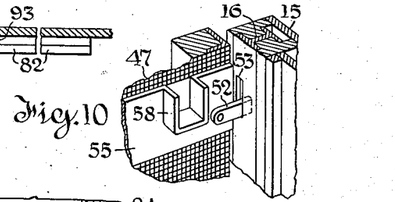
Figure 10 is a detail view in perspective of the latch device for the bunker side walls shown in Figures 2 and 6, for example.

According to the illustrated embodiment of this invention, the car is also provided with side wall sections 46, 47. These sections 46 and 47 form the opposite side walls of an ice bunker for the car when the car is to be used for ice refrigerating purposes. The other two walls of the ice bunker are formed by the car end wall posts 11 and screen 12 and the bulkhead 15 (see Figure 2). As the construction, function, and support of the two bunker side walls 46, 47 is the same, a description of only one bunker side wall is required. The bunker side wall 46, for example, comprises a reinforced frame which is provided on one side with screening 51. The bunker side wall 46 is pivotally secured as by means of hinges 52a to the adjacent car end wall corner post 11, so that it (46) may be swung to a position along car side wall 3 (as in Figure 2) when the ice bunker is to be formed for receiving ice, or to a position along the car end wall screen 12 (Figure 6) when full car loading is desired. Each bunker side wall (46, 47) is secured in the full line position of Figure 2 by means of a pivotally mounted latch 52 (see Figures 4 and 10) which engages in a recess 53 cut in the corresponding I-beam 16 of the bulkhead 15. Fastening devices are also provided for retaining the bunker side walls 46 and 47 in place when folded against the car end wall screen 12. Each fastening device may comprise a hook and pin connection 54 as shown in Figures 2 and 6, the hook being pivotally connected to the car end wall structure and the pin connected to the bunker side wall framing. The bunker side walls 46 and 47 may also be retained in the position of Figure 6 by means of stop plates 54a secured to the lower two strut members 35 as shown in Figures 6 and 7. These stop plates 54a assume bunker side wall retaining position with the the lower strut members 35 arranged in the upright position, the strut members 35 being placed in upright position after the bunker side walls 46 and 47 are folded to the position along the car end wall screen 12. These stop plates 54a serve to brace the bunker side walls 46 and 47 when placed along the car end wall screen 12, so that the bunker side walls 46 and 47 do not depend on only the hook and pin connections 54 to take the severe shocks incident to car switching operations.

When the sections 46 and 47 are in use as ice bunker side walls, they are also adapted to provide support for an ice grate structure. For such purpose, each bunker side wall (46, 47) is provided with upper and lower plate-like members 55 and 56. Each member (55 and 56) has two similar seats or pockets 57 and 58 (see Figures 4, 7 and 10). In their ice bunker forming position, the ice bunker side walls 46 and 47 are supported adjacent the car end wall by means of their hinges 52a and adjacent the bulkhead 15 by means of rests or seats 59. Each end I-beam 16 of the bulkhead 15 is provided with one of the rests or seats 59 to receive and support the adjacent lower corner of the adjacent bunker side wall (46, 47). As each bunker side wall (46, 47) is swung from the position of Figure 6 to the position of (for example) Figure 4, the outer end of its lower or bottom edge slides onto the corresponding rest or seat 59 and then is supported thereby as may be seen in Figure 4.

Ice, when introduced into the ice bunker of

Figure 3, is supported on a grate structure which may comprise a series of separate grate sections 61 and two I-beams 62, 63. The ice grate sections 61 may, if desired, be four in number. When the ice bunker is to be filled with ice, the I-beams 62 and 63 are so placed as to rest on the lower two strut members 35 (Figures 3 and 7) and to have their opposite ends received in the seats or pockets 57, 58 of the bunker side wall members 56. At each end of each I-beam (62, 63), its lower flange is provided with an angle piece 64 (Figure 7) to abut the adjacent beam pocket (57, 58) and prevent endwise movement of the I-beam (62, 63). The I-beam 62 is provided with clips 65 (see Figure 7) for engaging the edges of the grate sections 61 facing the car end wall and preventing shifting of the grate sections 61 toward the car end wall 2. These clips 65 may be welded or otherwise secured to the beam 62. These clips 65 may be provided in such number and arrangement that each ice grate section 61 is engaged by two of the clips 65.

In event part-stage icing of the ice bunker is desirable, the I-beams 62, 63 are placed on the upper two strut members 35 with the I-beam ends resting in the pockets 57, 58 of the bunker side wall plates 55. The ice grate sections 61 are then placed on the I-beams 62, 63.

It will thus be noted provision is made for supporting the I-beams 62, 63 and ice grate sections 61 in either a lowered position for full bunker icing or an elevated position for part-stage icing. In both positions the I-beams 62, 63 are supported at their ends by the bunker side walls 46, 47 and intermediate their ends by a set of strut members 35. The strut members 35, therefore, not only provide reinforcement for the bulkhead 15, but also provide support for the ice grate sections 61 and their I-beams 62, 63.

When the car is converted for full car loading, the I-beams 62, 63 are placed as shown in Figures 5 and 6 so that they may support the ice grate sections 61 at the same level as the floor racks 8. The ice grate sections 61 will now serve as a continuation of the floor racks 8 and lading may be placed in the car for substantially its entire length. For the purpose of full car loading, the I-beams 62, 63 are supported at their opposite ends in seats or pockets 71 and intermediate their lengths by legs 73. Each pocket or seat 71 is arranged and secured in place as illustrated in Figure 7, which shows two of the seats 71 at one side of the ice bunker space. Duplicates of these seats 71 are similarly positioned and secured at the opposite side of the ice bunker space. Each seat or pocket 71 is spaced from the drip pan 9 by a block 74. The I-beam legs 73 may be welded to the respective I-beam (62, 63) and rest on the drip pan 9 when the ends of the I-beams 62, 63 are disposed in their respective pockets 71. The legs 73 are so positioned on their respective I-beams (62, 63) that when resting on the drip pan 9, they (73) are directly over and receive support from car floor beams 76 (see Figure 6).

With the I-beams 62, 63 positioned as in Figure 6, the upper edges of the pockets 71 extend above the upper I-beam (62, 63) flanges and provide abutments for the adjacent ice grate sections 61 to prevent their shifting transversely of the car. As an alternative construction, the upper edges of the pockets 71 may be at a level with the bottom surfaces of the ice grate sections 61, and narrow sections of ice grating (not shown) may be welded to the pockets 71 and secured to the car structure to provide with ice grate sections 61 a flush load support from car side wall to car side wall. In this alternative construction, the narrow sections of ice grating would also serve as abutments for the adjacent ice grate sections 61.

Shifting of the ice grate sections 61 toward end wall 2 of the car, when the sections 61 are in position to support lading (Figure 5), is prevented by the clips 65 carried by the I-beam 62. Endwise shifting of the I-beams 62, 63 is prevented by engagement of their angle sections 64 with the adjacent edges of the pockets 71.

When the ice grate sections 61 are arranged as a continuation of the floor racks 8 as in Figure 5, the weight of the lading supported by the ice grate sections 61 is distributed by the legs 73 between the floor beams or sills 76 and by the pockets 71 and their supporting blocks 74 between the car beams 77 (Figure 6).

Figure 11:
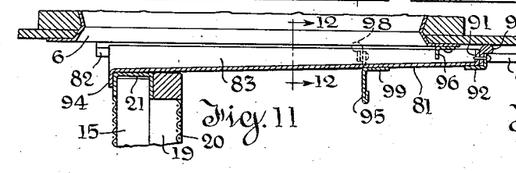
Figure 11 is an enlarged detail view of the water and cinder shield or deflector shown in Figure 5.
Figure 12:
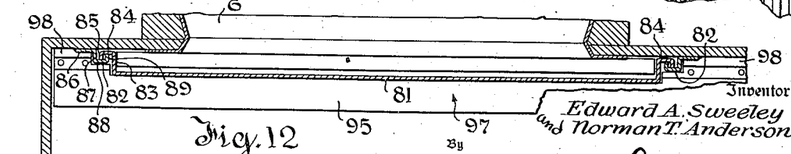
Figure 12 is a further detail view of the water and cinder shield or deflector and is taken on line 12—12 of Figure 11.

The hatchways 6 in the car roof 5 are so positioned as to be located at or near the center of the space between the car end wall 2 and the bulkhead 15 with the bulkhead positioned as in Figure 3 to form a partition. The hatchways 6 are then in position for the introduction of ice into the ice bunker. When the bulkhead 15 is adjusted to the position of Figure 5 for full car loading, it (bulkhead 15) assumes a position below the hatchways 6 and between the center line of each hatchway 6 and its side adjacent the car end wall 2. In order to avoid cinders and water falling through the hatchways 6 and onto the lading and damaging same when the bulkhead 15 is arranged as in Figure 5, each hatchway 6 is provided with a shield or deflector 81 which is slidable in a pair of supporting tracks or guides 82. As the shields 81 are of the same construction and are similarly mounted and operated, a description of one of the shields 81 will be sufficient here. The shield 81 is imperforate and has its side marginal portions similarly shaped (Figure 12) to provide an upstanding portion 83, a laterally extending portion 84, and a depending flange 85. Each track or guide 82 has a flanged portion 86 secured to the car ceiling, a depending portion 87, a laterally extending portion 88, and an upstanding flange 89. Each track 82 and the adjacent shield edge thus have channel-shaped sections which are arranged in sliding, interfitting relation to provide for shifting of the shield 81 while preventing water and cinders from passing over the sides of the shield or deflector 81 and onto the merchandise in the lading space. The rearward edge (Figure 11) of the shield 81 is formed by an upstanding flange 91 to which is secured a reinforcing angle bar 92. A length of weatherstripping 93 is secured between the flange 91 and the bar 92 and extends upwardly to engage the car ceiling for preventing water and cinders from passing over the rearward edge of the shield 81 and onto the lading. The section of the shield 81 between its channel-shaped side edges is inclined from its rearward flange 91 to its opposite edge to provide drainage toward the car end. The shield 81 is also provided with two spaced depending flanges 94, 95 which extend transversely of the car and below the level of the top edge of the bulkhead 15. When the bulkhead 15 is moved from the position of Figure 3 to the position of Figure 5, the top front edge of the bulkhead 15 moves into engagement with the shield flange 94 and then through this engagement shifts the shield 81 to a position under the hatchway 6. With the arrangement of Figure 5, water and cinders falling through the hatchway 6 and onto the shield 81 are caught by the latter and discharged over the shield flange 94 and into the space between the car end wall 2 and the ice bunker 15, through which space the drainage falls until it is collected in the drip pan 9. When the bulkhead 15 is returned to the position of Figure 3, it first moves relatively to the shield 81 until the top of the bulkhead 15 engages the shield flange 95. The engagement of the flange 95 and the bulkhead top now causes the shield 81 to be shifted simultaneously with the adjustment of the bulkhead 15 until the position and arrangement of Figure 3 is reached. The shield flanges 94 and 95 are relatively spaced so that the shield 81 will have just passed the hatchway 6 when the bulkhead 15 is in position to serve as the partition between the ice bunker space and the lading space (Figure 3).

As an additional precaution against cinder and water entering the car lading space, a stop 96 (Figures 3 and 11) for the shield 81 may be secured adjacent the hatchway 6, and between the tracks 82. The stop 96 may be an angle iron having one flange depending and the other flange secured to the car ceiling.

The flange 95 may be an intermediate part of a sheet-like member 97 (Figure 12) extending across the car, below the shield 81, and at opposite sides of the shield 81, the bottom edge of the member 97, including flange part 95, being just below the level of the top edge of the bulkhead 15. The top edge of portions of the member 97 extending at opposite sides of the shield 81 may carry weatherstripping 98 (see Figure 12). The member 97 may have a bent portion 99 which is secured to the bottom of the shield 81 to hold member 97 and its flange part 95 in place for movement with the shield 81. When the bulkhead 15 is in the position of Figure 3, the flange 95 closes the space between the shield 81 and the top of the bulkhead 15 and the remainder of the member 97 closes the space between the car ceiling and bulkhead top and at opposite sides of the shield 81.

Operation

When full bunker icing is desired, the facilities are arranged as in Figure 3. The bulkhead 15 is supported and locked in extended position to serve as a partition between the ice bunker space and the lading space. The strut members 35 are hooked to the bulkhead 15 which is thereby reinforced by the car end wall. The bulkhead 15 is supported from the car side walls 3, 4 by means of the rollers 22 (Figure 1) and is also secured to the car side walls 2, 3 by the bolts 27 engaging corresponding nuts 26 of the side wall plates 25. The bunker side walls 46 and 47 are secured to the bulkhead 15 by means of latches 52 and space the side edges of the bulkhead 15 from the car end wall 2. The ice grate structure (61, 62, 63) is supported by the lower struts 35 and by the lower pockets 57 and 58 of the bunker side walls 46, 47. Each water and cinder shield or deflector 81 is retracted to a position at one side of its hatchway 6. The ice bunker may now be supplied with ice through the hatchways 6. When the bunker is supplied with ice, each hatchway 6 may be closed by any suitable closure (not shown).

In part-stage icing, the bunker arrangement is the same as that shown in Figure 3, except that the ice grate structure (61, 62, 63) in part-stage icing is supported by the upper struts 35 and by the upper pockets 57, 58 of the bunker side walls 46, 47.

Figure 4:
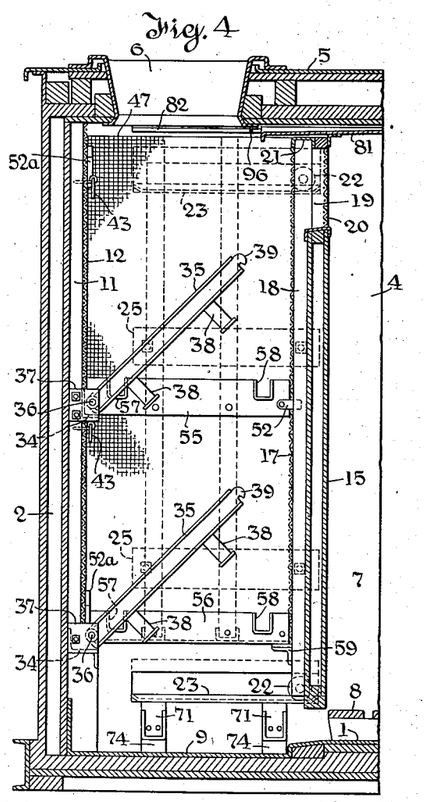

In the event the car is to be ventilated through the hatchways 6, or full car loading is desired, the ice bunker may be rearranged as follows. The ice grate structure (61, 62, 63) is removed from the struts 35 and from the pockets 57, 58 and placed in the bottom of the bunker space as previously described and as shown in Figures 5 and 6. The ice grate sections 61 are now flush with the floor racks 8 and in position to support lading or merchandise. The strut members 35 are swung as illustrated in Figure 4 to the upright position of Figures 5 and 6, in which they are secured by loops 43. As the strut members 35 are swung upwardly, their hooked shaped ends are released from their engagement with the bulkhead 15. The latches 52 are swung on their pivotal supports to release the bunker side walls 46, 47 which then may be swung or folded on their hinges to positions along or against the car end wall screen 12, in which positions the bunker side walls 46, 47 may be retained by the hook and pin connections 54 (see Figure 6 and the broken line position of 46 in Figure 2). In their folded positions, the struts 35 are disposed in the space between the bunker side walls 46 and 47 as shown in Figure 6. The bolts 27 securing the bulkhead 15 to the car side walls 3 and 4 are retracted, and the bulkhead 15 is rolled on its rollers 22 from the extended position of Figures 3 and 4 to the retracted position of Figure 5, in which the bulkhead 15 is adjacent to the car end wall screen 12 and is braced by the projections or abutments 38 carried by the upright strut members 35. The bulkhead 15 is locked in this retracted position by securing the bolts 27 to adjacent nuts 26 carried by the car side wall plates 25. As the bulkhead 15 is shifted toward the car end wall 2, the upper bulkhead portion shifts the shields or deflectors 81 from the position of Figure 3 to the position of Figure 5.

When the car is being ventilated and the ice bunker facilities are adjusted as shown in Figure 5 and the hatchways 6 are open, the atmospheric air may enter through the open hatchways 6, will be deflected toward the car end wall 2 by the shields 81, and may then enter the lading space along either or both of two courses. The air may pass through the opening 19 in the top of the bulkhead 15 and into the top portion of the lading space 7. The air may pass downwardly between the bulkhead 15 and the car end wall 2, under the bottom edge of the bulkhead 15, and then upwardly through the ice grate sections 61 and the floor racks 8. Air also may leave the lading space 7 by flowing through the bulkhead opening 19, then over the shield 81 and out through the hatchways 6, or it may leave through the end wall space and the top bulkhead opening 19.

The foregoing is to be understood as illustrative, since this invention includes all modifications and embodiments coming within the scope of the appended claims.

We claim:

1. In a railway or other vehicle for transporting merchandise having a main floor with a drip pan at one end thereof and a false floor above said main floor, the combination comprising a removable grating adapted to be positioned over said drip pan to provide a continuation of said false floor, a bulkhead extending transversely of the vehicle interior and shiftable over said grating and from a position adjacent the corresponding vehicle inner end wall to a position adjacent said false floor, bunker side walls foldable during non-use to positions along said vehicle inner end wall and for use to positions along the vehicle inner side walls, and means adapted to provide reinforcement between said vehicle inner end wall and said bulkhead and to provide support for said grating in an elevated ice supporting position during use of said ice bunker to receive ice for refrigerating the vehicle.

2. In a railway or other vehicle for transporting merchandise, the combination comprising a bulk-head extending transversely of the vehicle interior and shiftable relative to a vehicle inner end wall between retracted and extended positions, at least one member pivotally secured to said vehicle inner side wall and foldable to an out-of-the-way position paralleling said vehicle inner end wall, one or more projections on said member and positioned to be engaged by said bulkhead with said member in said out-of-the-way position and with said bulkhead in retracted position, said member being adapted to be swung from said out-of-the-way position to a horizontally extended position to provide reinforcement between said vehicle inner end wall and said bulkhead with said bulkhead in said extended position, and an ice grate structure adapted to be removably placed on and at least partially supported by said member with said member in said horizontally extended position.

3. In a railway or other vehicle for transporting merchandise, the combination comprising a bulkhead extending transversely of the vehicle interior and shiftable toward and away from a vehicle inner end wall, a plurality of separate strut members, each independently and pivotally supported adjacent one end by said vehicle inner end wall and having adjacent the other end thereof a hook-shaped portion to engage said bulkhead with said bulkhead spaced from said vehicle inner end to provide an ice bunker compartment, each of said struts being adapted to be swung to an upright position against said vehicle inner end wall, and means on and projecting from the underside of each of said struts for engaging and bracing said bulkhead with the struts in said upright positions and with said bulkhead shifted to a position adjacent said vehicle inner end wall.

4. In a railway or other vehicle for transporting merchandise, the combination comprising a bulkhead extending transversely of the vehicle interior and adjustable toward and away from a vehicle inner end wall; bunker side walls adapted to extend along the vehicle inner side walls and to space said bulkhead relatively to said vehicle inner end wall, said bunker side walls being adapted to be swung to a position along said vehicle inner end wall; upper and lower sets of strut members, each of said members being independently movable, being separately and pivotally connected to the vehicle inner end wall and being adapted to be swung between upright and horizontal positions with the bunker side walls in position along the vehicle inner end wall; and an ice grate structure including ice grate sections and supporting beams, said ice grate structure being adapted to be removably placed on either of said sets of strut members and to be supported by such strut member set and by said bunker side walls with said strut members in the horizontal position thereof and with said bunker side walls positioned along said vehicle inner side walls; said strut members in the horizontal position thereof being also adapted to engage said bulkhead with said bulkhead spaced from said vehicle inner end wall by said bunker side walls and thereby provide reinforcement for said bulkhead, said strut members in the upright position thereof being adapted to engage and brace said bulkhead with the bulkhead in a retracted position adjacent said vehicle inner end wall and with the bunker side walls arranged along the vehicle inner end wall and in parallel relation with said bulkhead.

5. In a refrigerator car or other vehicle having a hatchway through the vehicle roof and adjacent an inner end wall of the vehicle, the combination comprising a water and cinder shield slidably supported under the vehicle ceiling, spaced flanges secured to and depending from said shield, each of said flanges extending transversely of said vehicle, and a bulkhead extending transversely of the vehicle interior and shiftable toward and away from said vehicle inner end wall, said bulkhead having a portion thereof extending upwardly between said shield flanges, whereby the engagement of said bulkhead portion and one of said flanges effects movement of said shield to a position underlying said hatchway as said bulkhead is shifted toward said vehicle inner end wall and the engagement of said bulkhead portion and the other of said flanges effects movement of said shield to a position at one side of said hatchway as said bulkhead is shifted away from said inner end wall.

6. In a refrigerator car or other vehicle having a hatchway through the car roof and adjacent an end wall of the car, the combination comprising tracks secured to the inner car ceiling, a water and cinder shield of imperforate construction and slidably supported in said tracks for movement to a position underlying said hatchway and to a position at one side of said hatchway, said shield having an upstanding portion extending along and adjacent the edge thereof remote from said car end wall and adapted to slidably engage the car ceiling to provide a water and cinder proof joint, said shield being inclined from adjacent said upstanding edge and toward said car end wall, and flanges depending from said shield for receiving therebetween the top portion of a bulkhead arranged in the vehicle for adjustment toward and away from said vehicle end wall.

7. A structure as recited in claim 6 wherein each track is of channel-shaped section and has interfitting, sliding connection with a channel-shaped side portion of the shield to provide a water and cinder proof joint along the sides of the shield.

8. In a railway or other vehicle for transporting merchandise, an ice bunker adapted for adjustment to provide for substantially full loading of the vehicle, said ice bunker comprising bunker side walls adapted to be positioned during non-use along an inner end wall of said vehicle and during use along the vehicle inner side walls, a bulkhead extending transversely of the vehicle interior and shiftable toward and away from said inner end wall, upper and lower sets of members each adapted for folding into an upright position adjacent said inner end wall and adapted further for positioning, during use of said bunker side walls with said bulkhead spaced from said inner end wall, to extend from said bulkhead to said end wall and serve as a strut therebetween, and an ice grate structure adapted to rest on said lower set of members with said lower set of members in said strut position, said ice grate structure being removable from said lower set of strut members for positioning on said upper set of members with said upper set in said strut position to form an elevated ice support within the ice bunker, said ice grate structure in each of said two positions on said sets of strut members being supported intermediate the ends thereof by the corresponding set of strut members and adjacent the ends thereof by said bunker side walls, said ice grate structure being also removable from said upper set of strut members and from the space between said inner end wall and said bulkhead.

9. In a railway or other vehicle for transporting merchandise having a main floor with a drip pan at one end thereof and a false floor above said main floor, the combination comprising a removable grating adapted to be positioned over said drip pan to provide a continuation of said false floor, a bulkhead extending transversely of the vehicle interior and shiftable over said grating and from a position adjacent the corresponding vehicle inner end wall to a position adjacent said false floor, bunker side walls foldable during non-use to positions along said vehicle inner end wall and for use to positions along the vehicle inner side walls, and movable members each adapted for positioning, during use of said bunker side walls with said bulkhead spaced from said inner end wall, to extend from said bulkhead to said end wall and serve as a strut therebetween, said grating, during use of said bulkhead and bunker side walls to form a bunker, being adapted for positioning to rest on said members in said strut position thereof and serve as an elevated support for ice in the bunker.

10. An ice bunker as recited in claim 9, wherein the grating includes grate sections and separate beams to provide a common support for said grate sections, and wherein said grating in the ice supporting position thereof is adapted to have said beams rest on the strut members with the ends of said beams supported by the bunker side walls.

11. In a railway or other vehicle for transporting merchandise, an ice bunker adapted for adjustment during non-use to provide for substantially full loading of the vehicle, said ice bunker comprising bunker side walls adapted to be positioned along the vehicle inner side walls during use and to be folded to out-of-the-way positions extending along a vehicle inner end wall, a bulkhead extending transversely of the vehicle interior and shiftable away from said vehicle inner end wall to an outer position to serve as a wall of the ice bunker and toward said vehicle end wall to a retracted or inner position, members pivotally secured to said vehicle inner end wall to provide upper and lower sets thereof, said members being positioned to pivot in planes intermediate the inner edges of said bunker side walls with said bunker side walls folded to extend along said end wall, the members of each of said sets being adapted for positioning to serve as horizontal struts extending from said bulkhead in the outer position thereof to said vehicle end wall, and an ice grate structure having a plurality of ice grate sections and a set of beams to provide a removable common support for said ice grate sections, said ice grate structure being adapted to be removably positioned at a lower level within the ice bunker and on the lower set of said horizontal strut members and support ice in the ice bunker and being further adapted to be removably positioned at a higher level within the ice bunker to rest on the upper set of said horizontal strut members and support ice in the ice bunker, said grate structure in each of said ice supporting positions having the beams thereof resting on the corresponding set of horizontal strut members with the ends of the beams resting on and supported by said bunker side walls.

12. A combination as recited in claim 11, wherein the ice grate structure is removable from the space between the vehicle inner end wall and the bulkhead, and the strut members are individually adapted to fold into vertical position adjacent the vehicle inner end wall.

13. In a railway or other vehicle for transporting merchandise, the vehicle merchandise chamber having a main floor with a drip pan at one end thereof and a false floor over said main floor and above the level of said drip pan, the combination comprising a bulkhead extending transversely of said chamber and movable over said drip pan from an outer position adjacent said false floor to an inner position adjacent the corresponding end wall of said chamber, bunker side walls adapted for positioning along the chamber side walls and to be folded to positions along said chamber end wall, a set of beams adapted to occupy a position in said drip pan with said bulkhead in said inner position and being further adapted to be supported in a second and elevated position by said bunker side walls with said bulkhead in said outer position, and ice grate sections adapted to rest on said beams in said drip pan position to form a continuation of said false floor, and further adapted to rest on said beams in the elevated position thereof to provide an ice support.

14. A combination as recited in claim 13, wherein foldable members are arranged between the chamber end wall and the bulkhead and are adapted for positioning to serve as struts extending from the chamber end wall to the bulkhead with the bulkhead in the outer position thereof, said members in said strut position being adapted to support the beams intermediate the ends thereof with the beams in the elevated position.

15. In a railway or other vehicle for transporting merchandise, an ice bunker comprising end and side walls, upper and lower sets of strut members extending between and connected to said end walls, and an ice grate structure resting on one of said sets of strut members and adapted for removal therefrom and for positioning on the other of said sets of members, said ice bunker being adapted to be collapsed by removal of said ice grate structure from the ice bunker space, by folding said side walls to spaced positions in planar relation along one of said end walls, by folding said strut members into positions within the space between said folded side walls, and by adjusting one of said end walls into a collapsed position adjacent the other of said end walls, each of said members in the folded position thereof forming a strut from one to the other of said end walls in the collapsed position thereof.

EDWARD A. SWEELEY.
NORMAN T. ANDERSON.